United States Patent [19]

Marcus et al.

[11] Patent Number: 5,254,337
[45] Date of Patent: Oct. 19, 1993

[54] DEODORIZING COMPOSITIONS FOR ANIMAL GROOMING

[75] Inventors: Bonita K. Marcus, Rye, N.Y.; Anthony J. Gioffre, Ridgefield, Conn.

[73] Assignee: UOP, Des Plaines, Ill.

[21] Appl. No.: 189,013

[22] Filed: May 2, 1988

Related U.S. Application Data

[63] Continuation-in-part of Ser. No. 67,977, Jun. 30, 1987, Pat. No. 4,795,482.

[51] Int. Cl.$^5$ .............................................. A23F 5/22
[52] U.S. Cl. ................................ 424/76.1; 424/409; 424/421; 252/174.17; 423/335; 423/339
[58] Field of Search ............... 424/76, 154, 157, 421, 424/409, 47, 76.1; 423/328, 329, 339, 335; 119/1; 252/174, 174.17

[56] References Cited

U.S. PATENT DOCUMENTS

| | | | |
|---|---|---|---|
| 3,702,886 | 11/1972 | Argauer et al. | 423/328 M |
| 3,709,979 | 1/1973 | Chu | 423/329 T |
| 3,917,814 | 11/1975 | Hedges et al. | 424/421 |
| 4,016,245 | 4/1977 | Plank et al. | 423/329 T |
| 4,056,610 | 11/1977 | Barber, Jr. et al. | 424/32 |
| 4,061,724 | 12/1977 | Grose et al. | 423/335 |
| 4,061,724 | 12/1977 | Grose et al. | 423/335 |
| 4,073,865 | 2/1978 | Flanigen et al. | 423/339 |
| 4,076,842 | 2/1978 | Plank et al. | 423/329 T |
| 4,085,704 | 4/1978 | Frazier | 119/1 |
| 4,297,335 | 10/1981 | Lok et al. | 423/328 C |
| 4,331,694 | 5/1982 | Izod | 426/422 |
| 4,406,859 | 9/1982 | Plank et al. | 423/329 T |
| 4,407,231 | 10/1983 | Colborn et al. | 119/1 |
| 4,437,429 | 3/1984 | Goldstein et al. | 119/1 |
| 4,503,023 | 3/1985 | Breck | 423/328 |
| 4,526,583 | 7/1985 | Gioffre | 8/137 |
| 4,569,833 | 2/1986 | Gortsema et al. | 423/329 |
| 4,622,920 | 11/1986 | Goss | 119/1 |
| 4,668,343 | 5/1987 | Bowmann | 119/1 |
| 4,727,824 | 3/1988 | Ducharme et al. | 119/1 |
| 4,749,374 | 5/1988 | Deffeves et al. | 119/1 |
| 4,795,482 | 1/1989 | Gioffre et al. | 55/75 |

OTHER PUBLICATIONS

"Proc. 5th Int. Conf. Zeolites, Naples, 1980" L. V. C. Rees, ed., Heyden, London pp. 760-780.
"Molecular Sieve Zeolites" by P. K. Maher et al, Advan. Chem. Soc. 101, American Chem. Society, Washington, D.C. 1971, p. 266.

*Primary Examiner*—A. A. Turner
*Attorney, Agent, or Firm*—Thomas K. McBride; Richard G. Miller

[57] ABSTRACT

Animal's coats are deodorized and optionally treated in other manners by the application thereto of a composition comprising a crystalline siliceous molecular sieve which has been at least partially activated with respect to organic molecular species and in which at least about 90 percent of the framework tetrahedral oxide units are $SiO_2$ tetrahedra and which have a sorptive capacity for water at 25° C. and 4.6 torr of less than 10 weight percent.

4 Claims, No Drawings

1

DEODORIZING COMPOSITIONS FOR ANIMAL GROOMING

This application is a continuation-in-part of copending application Ser. No. 067,977, filed Jun. 30, 1987, now U.S. Pat. No. 4,795,482.

1. Field of the Invention

The present invention relates in general to the treatment of animals and more particularly to the method for deodorizing animal s fur or skin by the topical application of a composition comprising at least one species of crystalline siliceous molecular sieve having certain physical and chemical properties hereinafter elucidated. The invention further relates to compositions useful in the practice of the deodorizing process.

2. Description of the Prior Art

A number of compositions for treating the fur and or skin of pet animals to remove or reduce their characteristic animal odor have heretofore been proposed. By far the most common of such formulations are primarily shampoos which are intended to remove the bulk of the odors by conventional washing and to cover or mask the residual odors with a strong fragrance. Since the readily available scents are those which are standard in the cosmetic industry, the masking fragrances tend to vaporize rapidly and function for only a few hours. As one solution to this problem it has been proposed in U.S. Pat. No. 4,668,434 to provide a non toxic, slow release system that may conveniently be added to most animal skin application products Particularly it is proposed to pre mix a commercial fragrance with a vinyl copolymer before incorporation into the animal skin product, such as shampoo, insect repellant or insecticide, to be applied to the animal coat.

SUMMARY OF THE INVENTION

It has now been found that unpleasant animal odors can be greatly reduced or eliminated for considerable periods of time by applying to the animal's coat or skin a composition which is preferably free of fragrance constituents. This composition consists essentially of a siliceous molecular sieve in which at least about 90, and preferably at least about 95 percent of the framework tetrahedral oxide units are $SiO_2$ tetrahedra, which have a sorptive capacity for water at 25° C. and 4.6 torr water vapor pressure of less than 10 weight percent, and which are at least partially activated with respect to organic molecular species. By the term at least partially activated with respect to organic molecular species as used herein is meant a capacity to preferentially adsorb, when initially applied to the animal being treated at least one odorous organic molecular species present on the animal's skin or fur. Thus while the molecular sieve can contain the maximum adsorbed water content for the atmospheric conditions in which the animal is situated, the adsorbed loading of odorous organic molecular species must be less than the maximum under the conditions prevailing at the time of treatment of the animal. The treating composition can contain from about 0.5 up to 10 percent, preferably from about 0.5 to 99 percent, by weight of the aforesaid siliceous molecular sieve material. The remainder of the treating composition is comprised of either inert materials or other constituents of animal grooming compositions which are conventional in the art and which do not prevent the active siliceous molecular sieve material from adsorbing the odorous organic species to be removed from the animal.

It will thus be apparent to those of routine skill in the art that while the present animal-grooming compositions can contain a wide variety of organic constituents, including fragrances, such constituents must be present in a form or in limited quantities such that the capacity of the siliceous molecular sieve adsorbents for odor-causing organic species is less than completely satisfied, preferably totally unsatisfied. Organic species which are too large to enter the pores of the molecular sieve can be present in unlimited amounts, for example, provided they are not coated on the molecular sieve crystals in a manner to prohibit the entry into the pore system of the odor-causing organic species to be removed from the animal's skin or coat. Even organic molecular species which have molecular dimensions small enough to enter the pores of the molecular sieve can, if adsorbed or absorbed more strongly, such as by chemisorption, on other adsorptive constituents of the overall composition can be present in the present compositions.

Accordingly, the compositions of the present invention can contain, in addition to the siliceous molecular sieve adsorbents, conventional grooming materials such as insecticides, hair conditioners, detergents and repellants.

Inert diluents, i.e. inorganic oxides or salts which are not harmful to the animal's coat or skin or harmful if ingested during the animal's own rooming of itself, or agglomerating agents can suitably be incorporated into the formulation in order to affect the physical characteristics of the product and facilitate application of, and retention on the animals skin and coat of, the essential siliceous molecular sieve adsorbent materials. Agglomerating agents are especially beneficial when the treating composition is in the form of a powder by forming larger particles of the powdered constituents so that the particles of the producer tend to remain at the point of contact with the animal's coat rather than forming clouds of dust. As a result, neat and uniform distribution can be achieved. Typical agglomerating agents include starch, silica powders, grain flours, wood flour, talc, pumice, clays, calcium phosphates, and the like, with starch being a preferred agent.

The siliceous molecular sieves suitably employed in the practice of the invention include the microporous crystalline aluminosilicates, i.e. the zeolitic molecular sieves as well as the so called silica polymorphs. With respect to the latter compositions, their crystal lattices are ideally formed entirely of $SiO_2$ tetrahedral units, but the as-synthesized forms commonly contain at least trace amounts of aluminum derived from aluminum impurities in the synthesis reagents. The aluminosilicate molecular sieves comprise the large class of well-known crystalline zeolites. These high-silica molecular sieves are either commercially available or are prepared by methods, well known in the art, involving direct hydrothermal synthesis or involving certain types of crystal lattice dealuminations. A comprehensive review article by E. M. Flanigen concerning both "high" Si/Al zeolites and silica molecular sieves is published in "Proc. 5th Int. Conf. Zeolites, Naples, 1980", L. V. C. Rees, ed., Heyden, London, pp. 760-780. This article is incorporated herein by reference.

It is a critical aspect of the present invention that the adsorptive capacity for water of the siliceous molecular sieve is less than 10, preferably less than 6, weight percent at 25° C. and a water vapor pressure of 4.6 torr. In the case of aluminosilicate molecular sieves, those useful in the present compositions for use in the present treating process have framework $SiO_2/Al_2O_3$ molar ratios of from about 35 to infinity, preferably from 200 to 500. All of the siliceous molecular sieves suitably employed have pore diameters of at least 5.5, and preferably at least 6.2, Angstroms.

The efficacy of the molecular sieves employed in the practice of the present invention is not dependent upon the presence of the water of hydration present in the internal cavities of the microporous structure as a result of their hydrothermal formation. In fact, at least a major proportion, usually substantially all, of this original water of hydration is removed in the process of removing any pore blocking templating agent which may be present in the adsorbent. Calcination effectively removes the organic moieties. Also, water washing or washing with a caustic or dilute mineral acid solution is advantageously utilized to remove extraneous synthesis reagents from the pore system. Lowering of the alkali metal content, particularly the non zeolitic, i.e., occluded alkali metal compounds can also be beneficial. These procedures also serve to remove the original water of hydration.

Many of the synthetic zeolites prepared using organic templating agents are readily prepared in a highly siliceous form—some even from reaction mixtures which have no intentionally added aluminum. These zeolites are markedly organophilic and include ZSM-5 (U.S. Pat. No. 3,702,886); ZSM 11 (U.S. Pat. No. 3,709,979); ZSM 35 (U.S. Pat. No. 4,016,245); ZSM 23 (U.S. Pat. No. 4,076,842); and ZSM 38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. No. 4,061,724 and 4,073,865, respectively. To the extent the aforesaid siliceous sieves are synthesized to have $SiO_2/Al_2O_3$ ratios greater than 35, they are frequently suitable for use in the present process without any additional treatment to increase their degree of hydrophobicity. Molecular sieves which cannot be directly synthesized to have both sufficiently high Si/Al and/or degree of hydrophobicity ratios can be subjected to dealumination techniques, fluorine treatments and the like, which result in organophilic zeolite products. High temperature steaming procedures for treating zeolite Y which result in hydrophobic product forms are reported by P. K. Maher et al., "Molecular Sieve Zeolites," Advan Chem. Ser. 101, American Chemical Society, Washington D.C., 1971, p266. A more recently reported procedure applicable to zeolite species generally, involves dealumination lattice site. This process is disclosed in Skeels et al. U.S. Pat. No. 4,503,023 issued Mar. 5, 1985. Halogen or halide compound treatments for zeolites to increase their hydrophobicity are disclosed in U.S. Pat. No. 4,569,833 and No. 4,297,335.

With respect to the foregoing adsorbents, it is important that the pore system be open so that the internal cavities of the crystals be accessible to the odor molecules. In the case of the aluminosilicates or silica polymorphs produced using large organic templating ions such as tetraalkylammonium ions, it is necessary to remove charge balancing organic ions and any occluded templating material in order to permit adsorption of the odor molecules. In such a removal process and also in the removal of inorganic debris, the original water of hydration is also removed. Upon exposure to the atmosphere a portion of the water of hydration is reacquired, but this does not affect the characteristics of the molecular sieve which are essential for the practice of the present invention, i.e., the molecular sieve can be employed in either a hydrated or dehydrated state, but in general the dehydrated state is preferred. In the case of most of the dealumination procedures referred to above, the original water of dehydration is also removed, and can similarly be replaced, if desired, for the practice of the invention.

It should be pointed out that it is the framework $SiO_2/Al_2O_3$ ratio which is important. This is not necessarily the same ratio as would be indicated by conventional wet chemical analysis. Especially in this case when dealumination has been accomplished by high temperature steaming treatments wherein aluminum-containing tetrahedral units of the zeolite are destroyed, but the aluminum values remain, at least in part, in the zeolite crystals. For such zeolite products, resort must be had to other analytical methods such as X ray and NMR. One such steam treated zeolite Y composition, denominated LZ-10, has been found to be particularly useful in the practice of the present process, especially when utilized in combination with the silica polymorph silicalite. The process for preparing LZ-10 is described in detail in U.S. Pat. No. 4,331,694 and in U.S. application Ser. No. 880,561 filed Feb. 23, 1978. A benefit appears to be obtained by such a combination of molecular sieves in all proportions, but each type of adsorbent is preferably present in an amount of at least 10 percent based on the total weight of the two adsorbents (hydrated weight basis).

A very wide variety of odor sources, i.e. organic molecular species, can be removed from an animal's coat or skin, whether originating with the animal or acquired by contact with extraneous materials. Even the very strong and offensive odor of skunk is effectively removed by the presnt compositions. The overall class of substances which can be removed includes both pleasant and unpleasant odors as perceived by human beings. For that reason the intentional application of masking fragrances to animals treated by the present process is actually counter productive in that it imposes additional burdens on the deodorizing molecular sieves. The unpleasant odors suitably removed include those attributed to organic species classifiable in one of the following subgeneric classes:

(a) Saturated or unsaturated aliphatic acids and aldehydes containing a single —COOH or —CHO group and containing less than 12 carbon atoms, such as acetic, propionic, butyric, valeric, isovaleric (alpha-methylbutyric), caproic and caprylic acids.

(b) organic sulfur containing compounds in which the valence of the sulfur atom is less than 6, especially those in which the valence of sulfur is 2, such as the sulfhydryl compounds, i.e. mercaptans and thiophenols of the general formula R-S-H wherein "R" represents an alkyl or alkenyl group containing from 1 to 8 carbon atoms or a phenyl or substituted phenyl group containing from 6 to 9 carbon atoms; the sulfides of the general formula $R—(S)_n—R$ wherein n has a value of from 1 to 4 and "R" represents the same groups as in the case of the aforesaid sulfhydryl compounds; the thioaldehydes and thioketones of the general formula

wherein R' is hydrogen or R, and R is an alkyl or alkenyl group containing from 1 to 8 carbon atoms or a phenyl or substituted phenyl group containing from 6 to 9 carbon atoms; and (c) organic nitrogen containing compounds in which the valence of the nitrogen atoms is 3, such as the aliphatic amines of the general formula $R_2NR'$ wherein R is hydrogen or R' and R' is an alkyl or alkenyl group having from 1 to 6 carbon atoms; and the heterocyclic nitrogen compounds containing an imino group in which the nitrogen atom is a part of the heterocyclic ring, particularly the pyrroles, and especially the pyrroles in which the alpha position is unsubstituted, and the condensed pyrroles which are the indoles, i.e. indole per se and the substituted derivatives thereof.

Specific compounds within the three subclasses designated above are acetic acid, propionic acid, butyric acid, gamma hydroxybutyric acid, valeric acid, isovaleric acid (alpha-methylbutyric acid), caproic acid, caprylic acid, isobutyraldehyde, methyl mercaptan, isoamyl mercaptan, n-butyl mercaptan, crotyl mercaptan, thiophenol, o-methyl thiophenol, allyl disulfide, allyl sulfide, diallylsulfide, amyl sulfide, benzyl sulfide, thiocresol, thioisobuteraldehyde, thioiisovaleraldehyde, gamma hydroxypropylmethyl sulfide $\beta$, $\beta'$-dichlorovinyl sulfide, dimethyl tetrasulfide, methyl amine, trimethyl amine triethyl amine, allyl amine, 3-methylindole (skatole), 4-methyl indole, 7-methyl indole, beta-(indolyl-3) propionic acid, $\alpha$-amino -$\beta$-(indolyl-3) propionic acid (tryptophan), an indoleacetic acid.

The method for applying the siliceous molecular sieve compositions of this invention to the skin or coat of the animal to be deodorized is not a critical aspect. A convenient means of application is simply to shake an effective amount of the composition, usually about 0.1 grams to 5.0 grams per square foot of animal coat depending upon the concentration of siliceous molecular sieve in the overall composition, on the animal, permit the composition to remain on the animal for a short period and then remove the bulk of the composition by brushing or by vacuuming. It is found that a small residual quantity of deodorant molecular sieve will usually remain even after vacuuming, and that this residue will continue to deodorize the animal for lengthy periods. It is to be noted that the composition as actually applied to the animal need not be in the form of a powder, but can be a suspension in a liquid medium such as water or other compounds which do not render the siliceous molecular sieves inactive by completely satisfying the adsorptive capacity thereof for adsorbing odor molecules. Upon drying or removal of the liquid medium a sufficient amount of the molecular sieve particles will or can be permitted to remain on the animal to accomplish the desired deodorization. Thus the term applying a powdered composition as used herein can include the actual application of a liquid or semi-liquid composition followed by drying.

What is claimed is:

1. A deodorizing animal grooming composition consisting essentially of from about 0.5 to 99 percent by weight of a crystalline siliceous molecular sieve which is in a state of being at least partially activated with respect to organic molecular species, has pore diameters of at least 5.5 Angstroms, and in which at least 90 percent of the framework tetrahedral oxide units are $SiO_2$ tetrahedra and which has a sorptive capacity for water at 25° C. and 4.6 torr water vapor pressure of less than 10 weight percent, at least one diluent or agglomerating agent selected from the group consisting of starch, silica powder, grain flour, talc, pumice and clay, and an insecticide or insect repellant.

2. Process for deodorizing an animal's coat or skin which comprises topically applying to said animal an effective amount of a crystalline siliceous molecular sieve which is in a state of being at least partially activated with respect to organic molecular species, has pore diameters of at least 5.5 Angstroms, and in which at least 90 percent of the framework tetrahedral oxide units are $SiO_2$ tetrahedra and which has a sorptive capacity for water at 25° C. and 4.6 torr water vapor pressure of less than 10 weight percent.

3. Process for deodorizing an animal's coat or skin according to claim 2 wherein in addition to the crystalline siliceous molecular sieve there is also topically applied to the coat or skin an insecticide or insect repellant and at least one diluent or agglomerating agent selected from the group consisting of starch, silica powder, grain flour, talc, pumice and clay.

4. Process for deodorizing an animal's coat or skin according to claim 2 wherein the composition topically applied comprises silicalite as the crystalline siliceous molecular sieve and at least one diluent or agglomerating agent selected from the group consisting of starch, silica powder, grain flour, talc, pumice and clay.

* * * * *